US012705615B2

(12) United States Patent
Baar et al.

(10) Patent No.: US 12,705,615 B2
(45) Date of Patent: Aug. 11, 2026

(54) SYSTEMS, METHODS AND APPARATUS FOR PAYMENT TERMINAL MANAGEMENT

(71) Applicant: Worldpay, LLC, Symmes Township, OH (US)

(72) Inventors: Erik William Baar, Cincinnati, OH (US); Patricia Lynn Walters, Phoenix, AZ (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 18/309,921

(22) Filed: May 1, 2023

(65) Prior Publication Data

US 2023/0267464 A1 Aug. 24, 2023

Related U.S. Application Data

(63) Continuation of application No. 17/213,053, filed on Mar. 25, 2021, now Pat. No. 11,669,837, which is a continuation of application No. 16/679,636, filed on Nov. 11, 2019, now Pat. No. 10,990,953, which is a continuation of application No. 16/227,447, filed on Dec. 20, 2018, now Pat. No. 10,510,060, which is a continuation of application No. 15/875,537, filed on Jan. 19, 2018, now Pat. No. 10,223,686, which is a continuation of application No. 14/203,734, filed on Mar. 11, 2014, now Pat. No. 9,916,567.

(60) Provisional application No. 61/790,693, filed on Mar. 15, 2013.

(51) Int. Cl.
*G06Q 20/30* (2012.01)
*G06Q 20/38* (2012.01)
*G06Q 20/40* (2012.01)
*G06Q 20/42* (2012.01)

(52) U.S. Cl.
CPC ........... *G06Q 20/401* (2013.01); *G06Q 20/30* (2013.01); *G06Q 20/382* (2013.01); *G06Q 20/38215* (2013.01); *G06Q 20/3829* (2013.01); *G06Q 20/425* (2013.01)

(58) Field of Classification Search
CPC ............. G06Q 20/425; G06Q 20/3829; G06Q 20/38215; G06Q 20/382; G06Q 20/30; G06Q 20/401
USPC ............................................................ 705/71
See application file for complete search history.

(56) References Cited

U.S. PATENT DOCUMENTS 4,951,247 A 8/1990 Kruse et al.
5,175,766 A 12/1992 Hamilton
5,864,667 A * 1/1999 Barkan .................. H04L 9/083 380/30
6,212,280 B1 4/2001 Howard et al.
8,600,881 B2 12/2013 Nguyen et al.
9,916,567 B1 3/2018 Baar et al.
11,416,855 B2 * 8/2022 Fiske .................. G06Q 20/327
2002/0066020 A1 5/2002 Whytock
(Continued)

*Primary Examiner* — Josnel Jeudy
(74) *Attorney, Agent, or Firm* — Bookoff McAndrews, PLLC

(57) ABSTRACT

Systems, methods and apparatus are disclosed for remote management of payment terminals. Public keys, or other security elements can be received from a certification authority and distributed to the payment terminals. A merchant, or other entity affiliated with the payment terminals, can monitor the status of the software and security elements of the payment terminals.

17 Claims, 8 Drawing Sheets

(56) References Cited

U.S. PATENT DOCUMENTS

| | | | | |
|---|---|---|---|---|
| 2002/0128982 | A1* | 9/2002 | Gefwert | G06Q 20/04 705/40 |
| 2003/0070080 | A1 | 4/2003 | Rosen | |
| 2004/0054630 | A1 | 3/2004 | Ginter et al. | |
| 2005/0033688 | A1* | 2/2005 | Peart | G07F 7/127 340/5.4 |
| 2006/0014526 | A1 | 1/2006 | Cherian | |
| 2006/0059346 | A1* | 3/2006 | Sherman | H04L 63/0823 713/185 |
| 2006/0140410 | A1 | 6/2006 | Aihara | |
| 2007/0199060 | A1 | 8/2007 | Touboul | |
| 2008/0247550 | A1 | 10/2008 | Kozaki et al. | |
| 2010/0070963 | A1 | 3/2010 | Bae et al. | |
| 2012/0173867 | A1 | 7/2012 | Hirabayashi | |
| 2013/0254116 | A1* | 9/2013 | Hayhow | G06Q 20/341 705/71 |
| 2014/0114860 | A1 | 4/2014 | Ozvat et al. | |
| 2017/0093570 | A1 | 3/2017 | Maruyama | |
| 2018/0167204 | A1 | 6/2018 | Wall et al. | |
| 2021/0174321 | A1* | 6/2021 | Rose | H04L 41/22 |

* cited by examiner

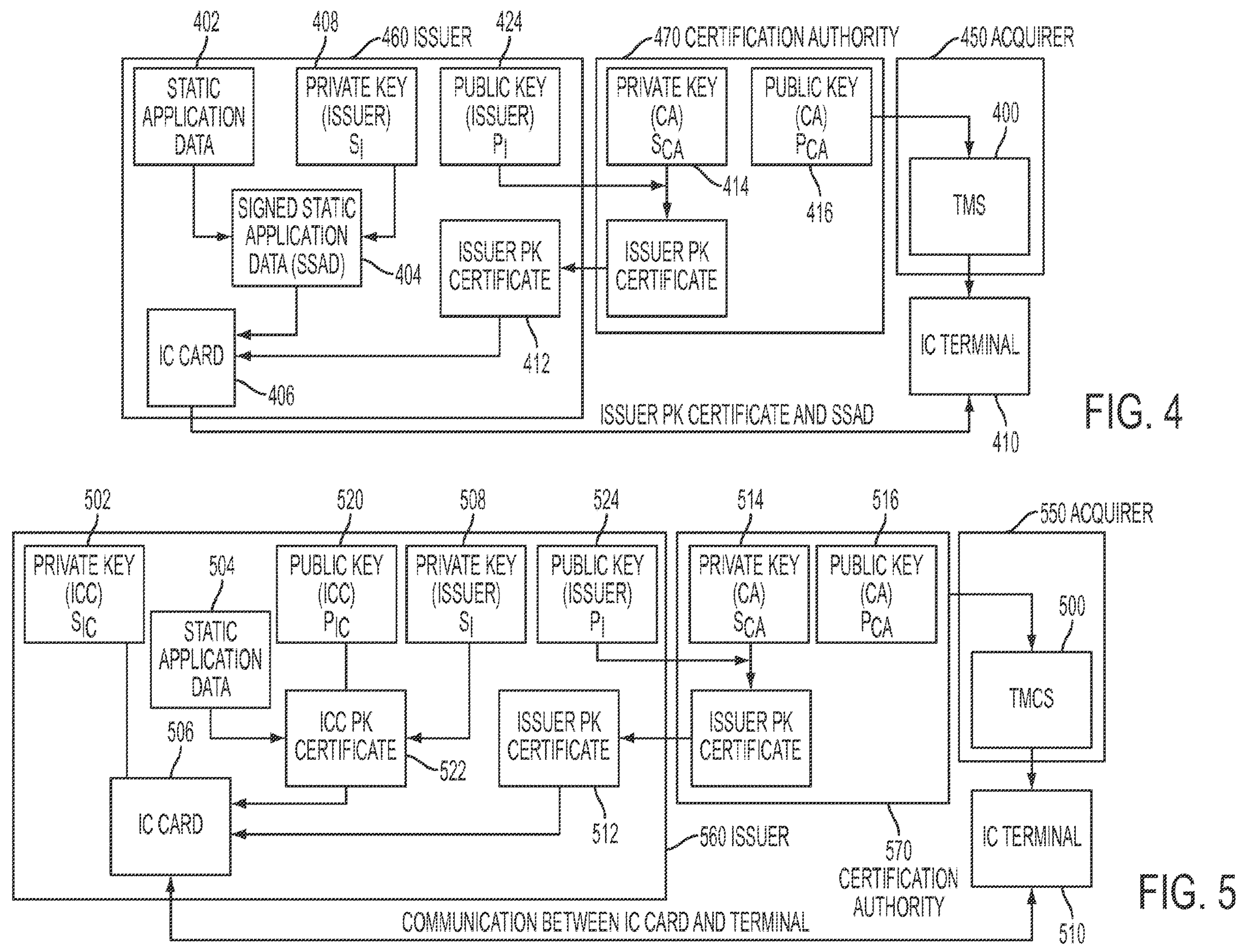
402
408
460 ISSUER
424
STATIC APPLICATION DATA
PRIVATE KEY (ISSUER) SI
PUBLIC KEY (ISSUER) PI
470 CERTIFICATION AUTHORITY
PRIVATE KEY (CA) SCA
414
PUBLIC KEY (CA) PCA
416
450 ACQUIRER
400
TMS
SIGNED STATIC APPLICATION DATA (SSAD)
404
ISSUER PK CERTIFICATE
412
ISSUER PK CERTIFICATE
IC CARD
406
IC TERMINAL
410
ISSUER PK CERTIFICATE AND SSAD
FIG. 4
502
520
508
524
514
516
550 ACQUIRER
PRIVATE KEY (ICC) SIC
504
STATIC APPLICATION DATA
PUBLIC KEY (ICC) PIC
PRIVATE KEY (ISSUER) SI
PUBLIC KEY (ISSUER) PI
PRIVATE KEY (CA) SCA
PUBLIC KEY (CA) PCA
500
TMCS
ICC PK CERTIFICATE
522
ISSUER PK CERTIFICATE
512
ISSUER PK CERTIFICATE
506
IC CARD
560 ISSUER
570 CERTIFICATION AUTHORITY
IC TERMINAL
510
COMMUNICATION BETWEEN IC CARD AND TERMINAL
FIG. 5

SYSTEMS, METHODS AND APPARATUS FOR PAYMENT TERMINAL MANAGEMENT

CROSS-REFERENCE TO RELATED APPLICATION

This application is a continuation of and claims the benefit of priority to U.S. application Ser. No. 17/213,053, filed on Mar. 25, 2021, which is a continuation of U.S. application Ser. No. 16/679,636, filed Nov. 11, 2019, now U.S. Pat. No. 10,990,953, which is a continuation of U.S. application Ser. No. 16/227,447, filed on Dec. 20, 2018, now U.S. Pat. No. 10,510,060, which is a continuation of U.S. application Ser. No. 15/875,537, filed on Jan. 19, 2018, now U.S. Pat. No. 10,223,686, which is a continuation of U.S. application Ser. No. 14/203,734, filed on Mar. 11, 2014, now U.S. Pat. No. 9,916,567, which claims the benefit of U.S. Provisional Application No. 61/790,693, filed on Mar. 15, 2013, the entireties of which are incorporated herein by reference.

BACKGROUND

Payment terminals enable customers to carry out a variety of financial transactions. Common types of payment terminals used by consumers include automated teller machines and point of sale (POS) devices. Examples of transactions that are sometimes carried out with payment terminals include the dispensing of cash, the making of deposits, the transfer of funds between accounts, the payment of bills, the cashing of checks, the purchase of money orders, the purchase of stamps, the purchase of tickets, the purchase of phone cards and account balance inquiries. Through an attended or unattended payment terminal, a customer can use a payment card to make purchases for goods or services. The types of transactions a customer can carry out at a payment terminal are determined by the particular machine, the system in which it is connected, and the programming of the machine by an entity responsible for its operation.

BRIEF DESCRIPTION OF THE DRAWINGS

It is believed that certain embodiments will be better understood from the following description taken in conjunction with the accompanying drawings in which:

FIG. 4 depicts an example process flow diagram for offline static data authentication.

FIG. 5 depicts an example process flow diagram for offline dynamic data authentication.

DETAILED DESCRIPTION

Figure 1:
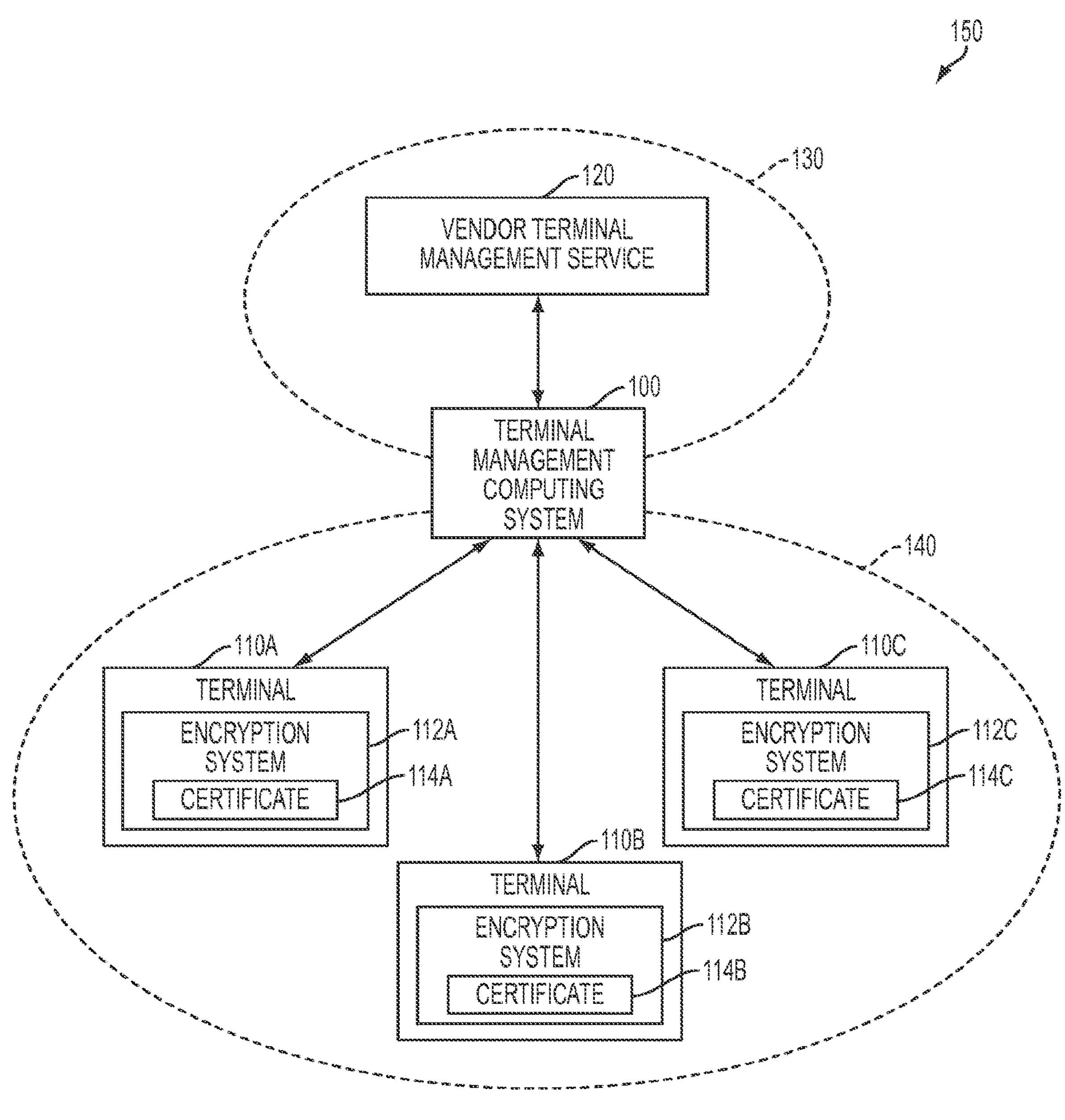
FIG. 1 depicts a block diagram of an example payment terminal communication system.

Various non-limiting embodiments of the present disclosure will now be described to provide an overall understanding of the principles of the structure, function, and use of payment terminal management systems, methods and apparatus disclosed herein. One or more examples of these non-limiting embodiments are illustrated in the accompanying drawings. Those of ordinary skill in the art will understand that systems, methods and apparatus specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Payment terminals can operate in a variety of environments. Payment terminals, such as automated teller machines (sometimes referred to as ATMs), can be used to dispense cash, make deposits, transfer funds between accounts, and so forth. Certain types of payment terminals can also be used in a customer service environment. Some types of payment terminals can be used to validate items which provide the customer with access, value or privileges such as tickets, vouchers, checks or other financial instruments. Other examples of payment terminals can include machines which are operative to provide users with the right to merchandise or services in an attended or a self-service environment, such as self-service POS systems in grocery stores and pay-at-the-pump fuel dispensers, for example. Some vending machines may incorporate payment terminals to receiving funds in exchange for goods stored within the vending machine Other examples of payment terminals include types of POS/cash registers and retail POS systems. For purposes of the present disclosure, unless otherwise specifically indicated, the term payment terminal is used to generally include any machine that can be operated to carry out transactions including transfers of value.

Some payment terminals are considered "attended" payment terminals. For these types of payment terminals, an attendant is present at the point of transaction and participates in the transaction by entering transaction-related data. The transaction occurs 'face to face'. Some payment terminals are considered "unattended" payment terminals. For these types of payment terminals, the cardholder conducts the transaction at the point of transaction without the participation of an attendant. The transaction does not occur 'face to face'. Some payment terminals are considered "online only" payment terminals. For these types of payment terminals, the transaction can normally only be approved in real time by transmission of an authorization request message. Some payment terminals are considered "offline with online capability" payment terminals. For these types of payment terminals, depending upon transaction characteristics, the transaction can be completed offline by the terminal or online in real time. It is equivalent to 'online with offline capability'. Some payment terminals are considered "offline only" payment terminals. For these types of payment terminals, the transaction can only be completed offline by the terminal. Some payment terminals are considered "operational control" payment terminals. For these types of payment terminals, an entity is responsible for the operation of the terminal. This entity is not necessarily the actual owner of the terminal.

Payment terminals can include various types of transaction function devices that are operated to carry out transactions. Different types of payment terminals include different types of devices. The different types of devices enable the payment terminals to carry out different types of transactions, including transactions involving goods, cashback, balance inquiry, funds transfer, and/or payment. Some types of payment terminals can include a depository for accepting deposits while other payment terminals do not. Some payment terminals have a "touch screen" while others have separate displays and input buttons. Payment terminals can also be fitted with devices such as cash and coin acceptors, statement printers, card readers, check validators, bill acceptors, thumb print readers and other types of devices, while other payment terminals do not include such devices.

Payment terminals may be connected to a host computer of an acquiring institution (sometimes referred to as an "acquirer") by communications links. The communications links may be non-persistent, requiring the payment terminals to reinitiate communications with the host computer of the acquiring institution. In certain embodiments, the communications links may be persistent, requiring dedicated bandwidth. In some embodiments, a payment terminal can communicate with a host computer through an Asymmetric Digital Subscriber Line (ADSL) using an ADSL modem. In other embodiments, a payment terminal can communicate with a host computer over a wireless connection established with transceivers. In some embodiments, a payment terminal can communicate with a host computer through a dialup connection.

Some payment terminals include software that serves to carry out various functionality. Example types of software can include encryption software that utilizes keys, ciphers, or other temporal-based encryption management tools (referred to generally herein as "certificates"). Payment terminals capable of reading certain types of payment cards, such as cards that are Europay®, MasterCard® and Visa® (EMV) compliant, for example, utilize encryption systems that require periodic updates in order to maintain functionality. The payment terminals can be in compliance with, for example, EMV Integrated Circuit Card Specifications for Payment Systems, Book 2, Security and Key Management, Version 4.3, November 2011, which is incorporated herein by reference. Payment terminals are often part of a closed-network, thereby making it difficult for the payment terminal to electronically contact, or otherwise communicate, with an entity that is not within the closed-network. In some cases, a vendor, or other entity, that is not within the payment terminal closed-network can offer certificate updates, software updates, and the like. Through use of a terminal management computing system, as described in more detail below, a payment terminal can receive the updated certificates, and other types of data, through communications with the terminal management computing system. Additionally, an entity, such as a merchant, can utilize a terminal management computing system to perform monitoring of one or more terminals affiliated with the entity. Through such monitoring, an entity can check operational status, software status, security status, receiving reporting, and so forth.

The presently disclosed embodiments are generally directed to systems and methods for providing payment terminal monitoring, encryption key/certificate management, software patch management, and remote terminal configuration and monitoring through a terminal management computing system. Such systems and methods can include, for example, a central terminal management computing system that is in communication with a plurality of payment terminals that are within a closed-network environment. These payment terminals may not be able to communicate with entities outside of the closed-network in which they operate due to security concerns, or other operational factors. In accordance with the present disclosure, the central terminal management computing system can also be in communication with one or more entities through open-network communications. Such entities include various global terminal management services of vendors or other certification authorities. The global terminal management services can generate updated certificates, provide software updates, provide other configuration files, and the like. Generally, the terminal management computing system facilitates communications between a payment terminal on a closed-network with an entity on an open-network. Such communications can be used for certificate management, software management, terminal configuration, terminal monitoring, and so forth. In some embodiments, a merchant can interface with the terminal management computing system to receive status information regarding particular payment terminals. The status information can include, for example, security compliance information, software version information, and so forth. For example, a particular merchant may be in control of tens or even hundreds of payment terminals (such as ATM machines, for example), each requiring to comply with various security system requirements. Using the terminal management computing system of the present disclosure, the merchant can receive reporting regarding the security status of the payment terminals or otherwise monitor its payment terminals.

Referring now to FIG. 1, a block diagram of an example payment terminal communication system 150 is depicted. The payment terminal communication system 150 includes a closed-network 140 and an open-network 130. The closed-network 140 can be, for example, a private payment network allowing for secured communication between payment terminals 110A-C and a terminal management computing system 100. In some embodiments, the terminal management computing system 100 can be part of a computing system of an acquirer, or any other suitable entity. The payment terminals 110A-C can be any type of payment terminal that can operate on a closed-network, such as a POS device, ATM, and so forth, as described above. The payment terminals 110A-C can be configured to interface with EMV cards, such as an integrated circuit card (ICC). Example suitable interfaces are provided by EMV Integrated Circuit Card Specifications for Payment Systems, Book 1, Application Independent ICC to Terminal Interface Requirements, Version 4.3, November 2011, which is incorporated herein by reference. The payment terminals 110A-C can include an encryption system 112A-C for encrypting communications emanating from the payment terminals 110A-C. Any suitable type of encryption technology or methodology can be used by the encryption systems 112A-C, which may vary from terminal to terminal. Some payment terminals 110A-C can utilize, for example, offline static data authentication. Such payment terminals can use a digital signature scheme based on public key techniques to confirm the legitimacy of critical ICC-resident static data. Some payment terminals 110A-C can utilize offline dynamic data authentication. Such payment terminals can use a digital signature scheme based on public key techniques to authenticate the ICC and confirm the legitimacy of critical ICC-resident/generated data and data received from the terminal. Other types of payment terminals 110A-C can utilize other authentication or encryption techniques. The encryption systems 112A-C can utilize certificates 114A-C which expire, or otherwise become inoperable, over time. In some embodiments, the certificates 114A-C are valid for a span of one year, although this disclosure is not so limited. Prior to a certificate 114A-C expiring, the terminal 110A-C can receive an updated certificate such that the payment terminal can continue to properly operate.

The vendor terminal management service 120, which can be part of the open-network 150, can generate the certificate updates, as well provide software updates, configurations, and the like. In some embodiments, the vendor terminal management service 120 generally functions as a certification authority. Since in this configuration the vendor terminal management service 120 is not part of the closed-network 140, the terminals 110A-C cannot directly communicate with the vendor terminal management service 120. Therefore, the terminals 110A-C cannot retrieve or receive updated certificates, or any other types of communications from the vendor terminal management service 120, which would require the terminals 110A-C communicating directing in or through the open-network 150. In accordance with the systems, methods and apparatus described herein, the terminal management computing system 100 can generally facilitate such transfer of data between the terminals 110A-C and the vendor terminal management service 120. The terminal management computing system 100 can communicate on the open-network 130 with the vendor terminal management service 120 to receive various data and, in turn, pass it along to the terminals 110A-C on the closed-network 140. While the particular type of open-network 130 used can vary based on the vendor terminal management service 120, among other factors, in some embodiments, the open-network 130 can be a public communications network (i.e., the Internet), a virtual private network (VPN), an intranet, or another type of third party network, for example.

Figure 6:
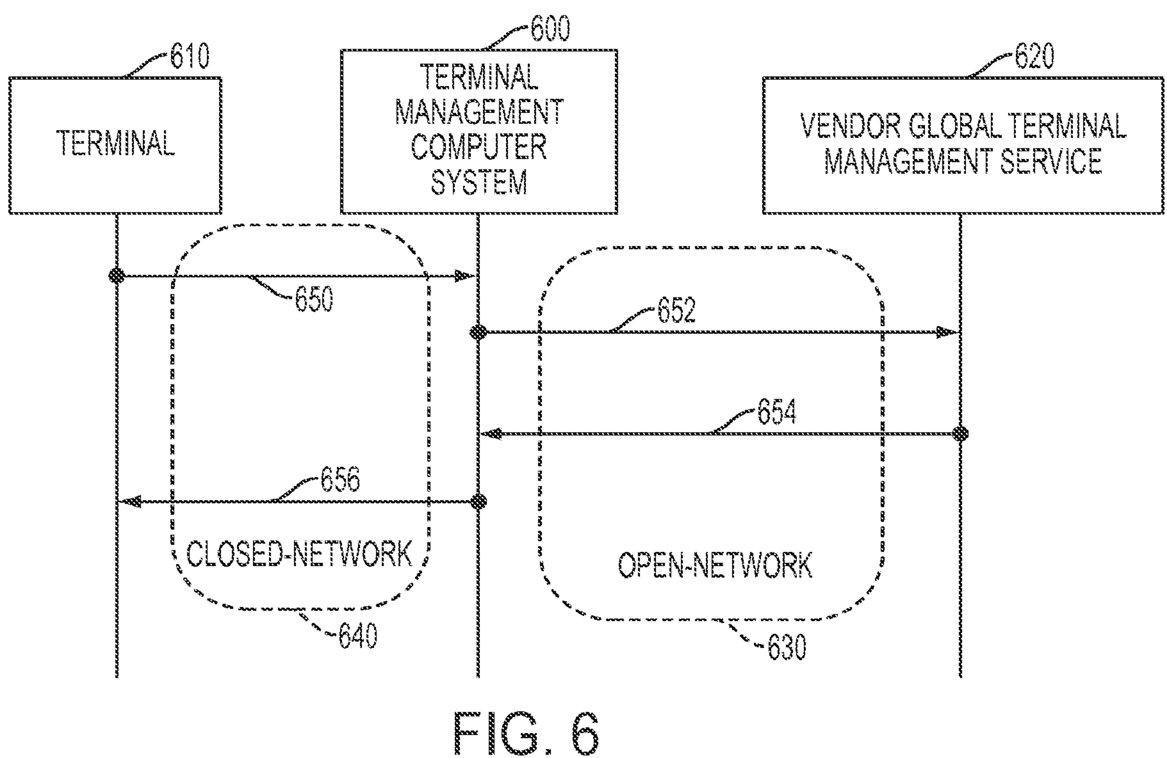
FIG. 6 depicts an example message sequence chart of a terminal communication system.
Figure 7:
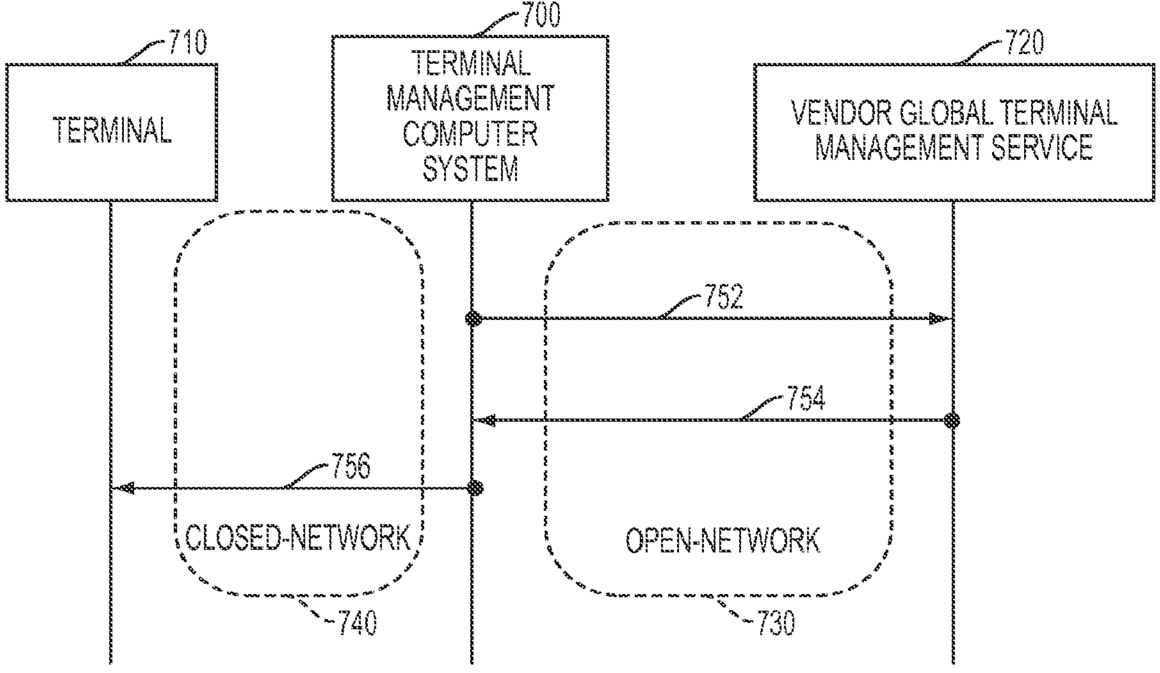
FIG. 7 depicts another example message sequence chart of a terminal communication system.
Figure 8:
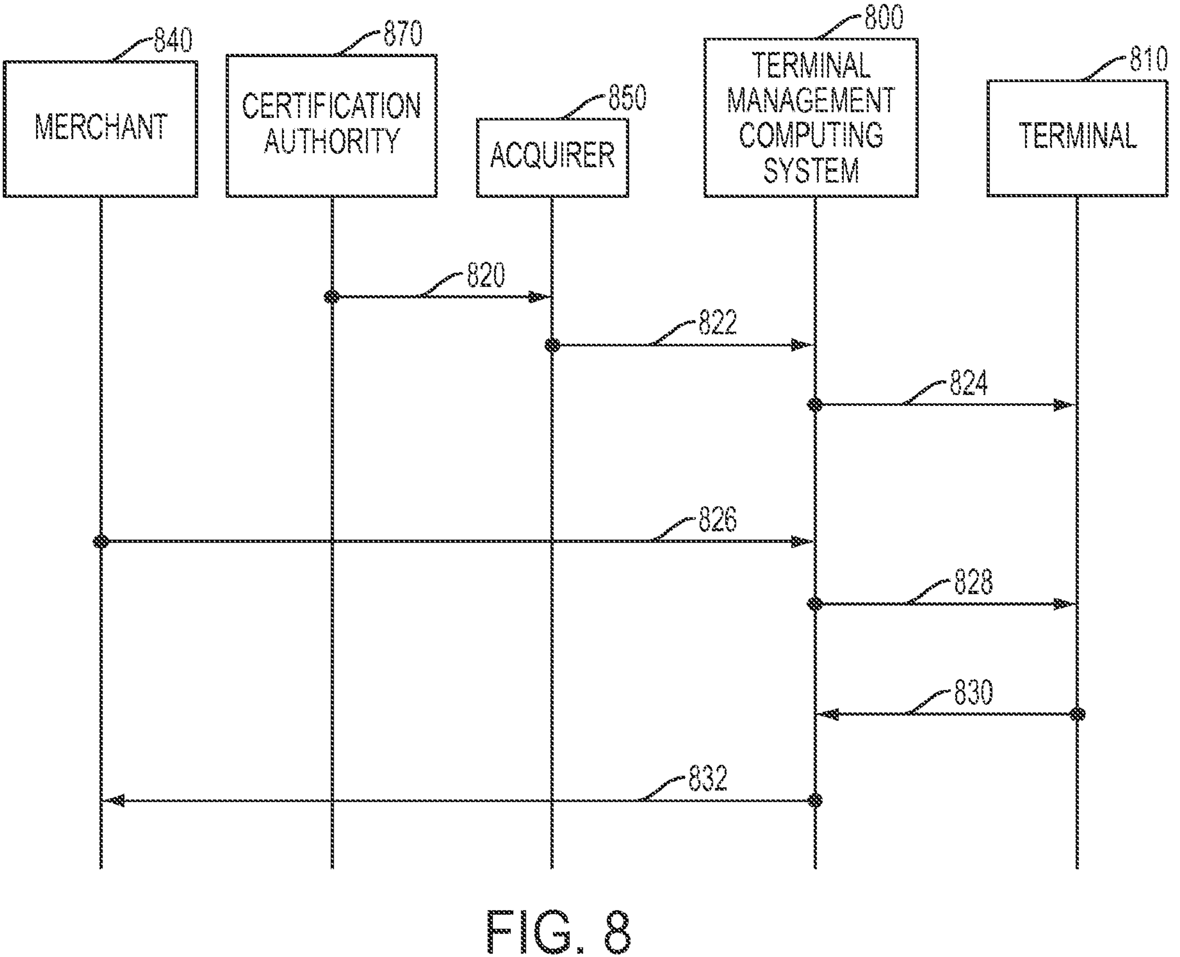
FIG. 8 depicts another example message sequence chart of a terminal communication system.

With specific regard to updating the certificates 114A-C, the terminal management computing system 100 can operate, for example, to "push" updated certificates to particular terminals 110A-C at certain intervals or based on certain circumstances. In other embodiments, the terminals 110A-C can "pull" the updated certificates at certain intervals or based on certain circumstances. Example message sequence charts for push and pull scenarios are illustrated in FIGS. 6-8 and are described in more detail below. In addition to certificate updates, the terminal management computing system 100 can be used to facilitate software updates, and/or terminal configuration, among other terminal management operations, such as confirming successful certificate updating.

Figure 2:
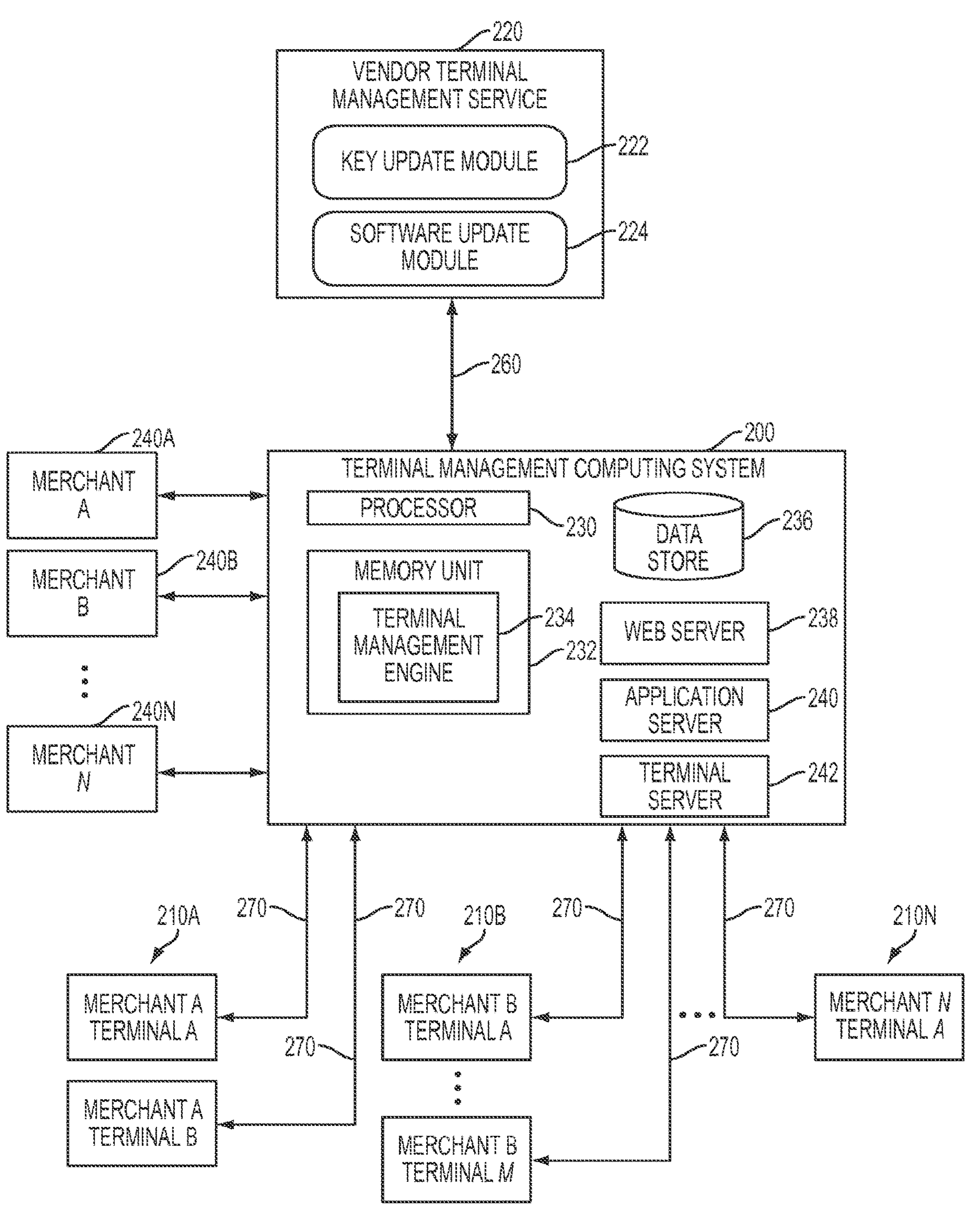
FIG. 2 depicts a block diagram of another example payment terminal communication system.

Referring now to FIG. 2, a block diagram of another example payment terminal communication system is depicted. The payment terminal communication system is shown comprising a vendor terminal management service 220, a terminal management computing system 200, and payment terminals 210A-N. Merchants using merchant computing devices 240A-N can be in communication with the terminal management computing system 200. Through this communication, a particular merchant using the merchant computing devices 240A-N can obtain information regarding any of its affiliated payment terminals 210A-N. In the illustrated embodiment, merchant A is affiliated with terminal A and terminal B, merchant B is affiliated with terminals A-M, and merchant N is affiliated with terminal A. As is to be appreciated, any suitable number of merchants (or other management entities) may interact with the terminal management computing system 200.

The terminal management computing system 200 can be provided using any suitable processor-based device or system, such as a personal computer, laptop, server, mainframe, or a collection (e.g., network) of multiple computers, for example. The content management system 200 can include one or more processors 230 and one or more computer memory units 232. For convenience, only one processor 230 and only one memory unit 232 are shown in FIG. 2. The processor 230 can execute software instructions stored on the memory unit 232. The processor 230 can be implemented as an integrated circuit (IC) having one or multiple cores. The memory unit 232 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 232 can store executable software and data for a terminal management engine 234. When the processor 230 of the terminal management computing system 200 executes the software of the terminal management engine 234, the processor 230 can be caused to perform the various operations of the terminal management computing system 200, such as monitoring, encryption key/certificates, software patch management, and remote terminal configuration and monitoring.

As shown in FIG. 2, the terminal management computing system 200 can include several computer servers and databases. For example, the terminal management computing system 200 can include one or more web servers (shown as web server 238), application servers (shown as application server 240), terminal servers (shown as terminal server 242), and/or any other type of servers. For convenience, only one web server 238, one application server 240, and one terminal service 242 are shown in FIG. 2, although it should be recognized that the disclosure is not so limited. The servers can cause content to be sent to the merchant computing device 240A-N in any number of formats, such as text-based messages, multimedia message, email messages, smart phone notifications, web pages, and so forth. The servers can also be used to send or receive data from the terminals 210A-N and/or the vendor terminal management service 220. The services can also cause content to be sent to or received from the vendor terminal management service 220. The servers 238, 240, 242 can comprise processors (e.g., CPUs), memory units (e.g., RAM, ROM), non-volatile storage systems (e.g., hard disk drive systems), etc.

The web server 238 can provide a graphical web user interface through which various users of the system can interact with the terminal management computing system 200. The web server 238 can accept requests, such as HTTP requests, from clients (such as web browsers on the merchant computing devices 240A-N), and serve the clients responses, such as HTTP responses, along with optional data content, such as web pages (e.g., HTML documents) and linked objects (such as images, video, and so forth). The application server 238 can provide a user interface for users who do not communicate with the terminal management computing system 200 using a web browser. Such users can have special software installed on a mobile communications device, for example, that allows them to communicate with the application server 238 via the network. The terminal server 242 can facilitate communication with the terminals 210A-N to provide updated certificates, check status, provide software updates or patches, and so forth.

The terminal management computing system 200 can comprise with one or more data stores (shown as data store 236), which can be any suitable type of database or data store. The data store 236 can store, for example, encryption-related information, such as keys, certificates, expiration dates, download dates, install dates and so forth. In some embodiments, the data store 236 can generally be configured to store encryption keys received by terminal management computing system 200 from the vendor terminal management service 220.

The terminal management computing system 200 can generally provide for management of the payment terminals 210A-N, including software management and encryption management. In some embodiments, an entity managing one of the secure payment terminals 210A-N, such as one of the merchants A-N can utilize the terminal management computing system 200 to schedule and push on-demand configuration, patches, and keys to the particular payment terminals that it manages. The terminal management computing system 200 can interface with the various payment terminals 210A-N through various network communications, schematically illustrated as network communications 270. Through network communications 270, the terminal management computing system 200 can perform various terminal management functions, such as the monitoring of software versions, monitoring key expiration, among other types of monitoring. Through network communications 270, the terminal management computing system 200 can also securely deliver data to secure payment terminals 210, such as updated certificates, software updates, software patches, configurations files, and so forth.

The terminal management computing system 200 can interface with the vendor terminal management service 220 through various network communications, which are schematically illustrated as communications 260. Through these network communications 260, the terminal management computing system 200 can retrieve software patches, updates, and keys, among other types of data from the global terminal management service 220. The vendor terminal management service 220 can comprise various modules, such as a key update module and a software update module 224. While only one vendor terminal management service 220 is illustrated in FIG. 2, it is to be appreciated that the terminal management computing system 200 can communicate with a plurality of different vendor terminal management service 220. For example, the particular secure payment terminals 210 in communication with the terminal management computing system 200 can have different types of software, that each require periodic updating from different types of vendors. The terminal management computing system 200 can track these requirements and contact the appropriate vendor terminal management service (e.g., 220) for the particular payment terminal 210A-N that is in need of an update.

In some embodiments, the terminal management computing system 200 proactively contacts the vendor terminal management service modules (e.g., 222) prior to the expiration of a certificate on one of the secure payment terminals 210A-N. Upon receiving the update certificate from the vendor terminal management service 220, it can be stored in the encryption key storage provided by data store 236. At a later point in time, the updated key can be provided to one or more of the secure payment terminals 210A-N through network communications 270. In some embodiments, the terminal management computing system 200 is configured to wait until a secure payment terminal 210A-N submits an update request. In other embodiments, the updated key is pushed to the secure payment terminals 210 at a certain time of day, such as during periods of light transaction payment activity. Optionally, a merchant A-N can interact with the terminal management computing system 200 to schedule, or otherwise, direct the updating or configuring of the payment terminals 210A-N. By way of example, one of the merchants A-N can be alerted that a particular certificate or software upgrade needs to be provided to a particular payment terminal A-N. The merchant can then selectively determine when that certificate or software upgrade is to be delivered to the payment terminals A-N. The merchant can provide to the terminal management computing system 200, for example, a selected time and date, a time range on a date, a time across a plurality of dates, a time range across a plurality of dates, and so forth. Using this approach, the merchant may be able to select a generally convenient time for the terminal management computing system 200 to interact with one of the payment terminals 210A-N. Additionally, subsequent to the interaction with the payment terminal, the terminal management computing system 200 can provide reporting to the merchant to show a particular software upgrade was successfully installed, a particular certificate was successfully received, or any other configuration activity was successfully completed. Thus, through the terminal management computing system 200, a merchant A-N may receive generally real-time information regarding the security and software status of any affiliated payment terminal 210A-N. Such reporting can be used, for example, for the merchant A-N to monitor compliance with various EMV-related specifications.

Figure 3A:
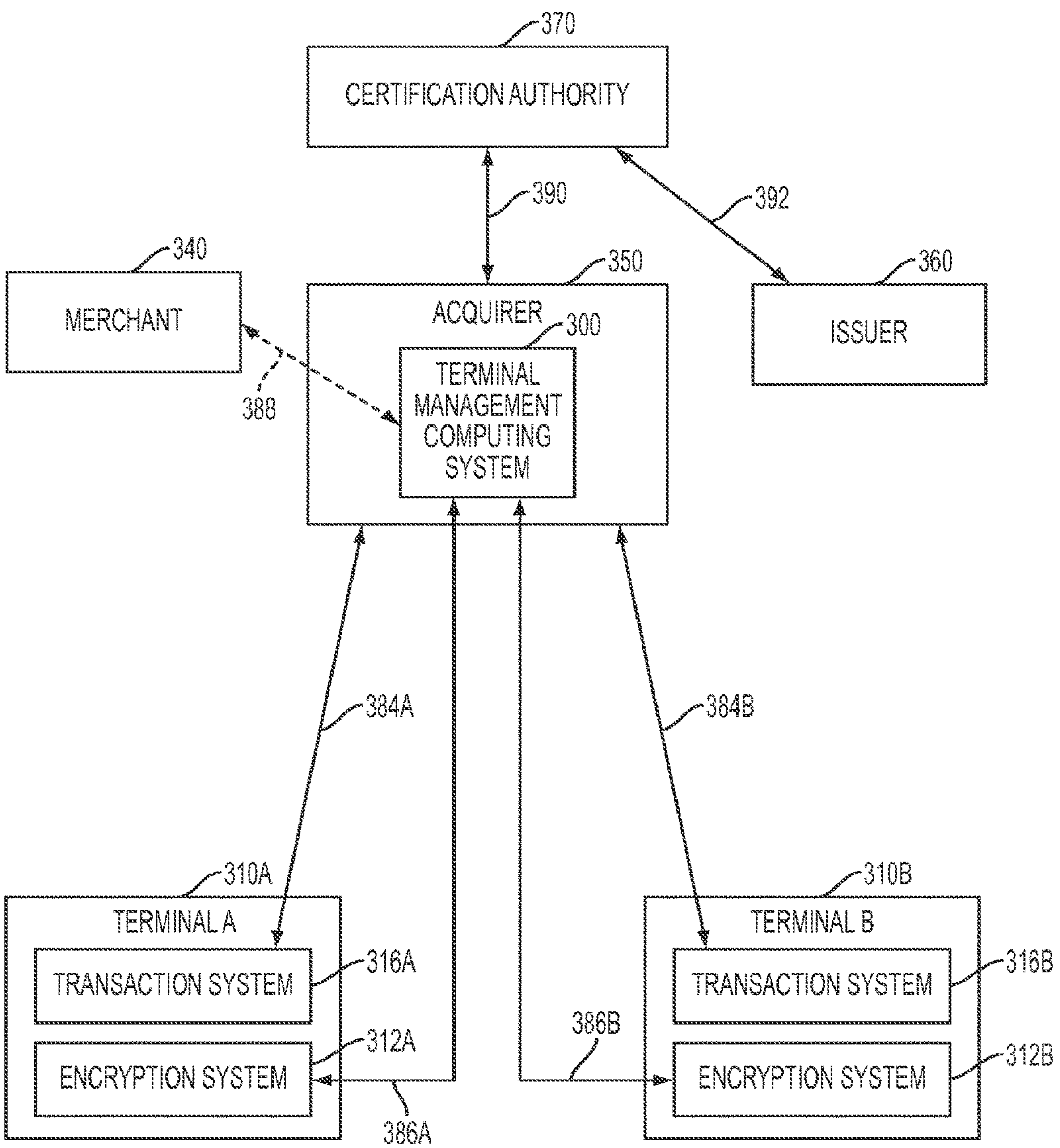
FIG. 3A depicts a block diagram of another example payment terminal communication system.

FIG. 3A depicts a block diagram of another example payment terminal communication system. In this embodiment, a certification authority 370 is in communication with an acquirer 350 and a card issuer 360. The certification authority 370 can be similar to the vendor terminal management service 220 described in FIG. 2, or can be any trusted third party that is a secure cryptographic facility that 'signs' keys. In some embodiments, the certification authority 370 can provide an issuer public key certificate to the card issuer 360 via communications links 392. The card issuer 360 can provide this certificate to an ICC. The public key can also be provided to the acquirer 350 via communications links 390. In this embodiment, acquirer 350 comprises a terminal management computing system 300, which may be similar to the terminal management computing systems 100, 200 of FIGS. 1 and 2, respectively. The acquirer 360 can be in communication with a plurality of payment terminals of various types. In the illustrated embodiment, the acquirer 360 is in communication with terminal 310A and terminal 310B via respective communications links 384A, 384B. Accordingly, the acquirer 360 can be used to process various types of transactions initiated by the transaction systems 316A, 316B of the terminals 310A, 310B. As provided above, the particular types of transactions may vary depending on the type of terminals, but example transactions include payment, providing funds, purchasing goods, balance inquiries, and balance transfers. In order to process such transactions, the acquirer 350 can communicate with various entities (not shown) within a payment network to send authorization requests, receive authorization replies, and so forth. The terminal management computing system 300 can utilize the encryption systems 312A, 312B of the terminals 310A, 310B when transferring data via communication links 386A, 386B. In some embodiments, communication link 384A is also communication link 386A and communication link 384B is also communication link 386B. Generally, the terminal management computing system 300 can communicate with the terminals 310A, 310B to perform terminal monitoring, remote terminal configuration, certification management, and so forth. Additionally, in some embodiments, a merchant 340 can interface with the terminal management computing system 300 via a communication link 388. Through this interface, the merchant 340 can monitor various terminals, run reports, and/or control the certification or software updating process. In some embodiments, the interface is presented through a web portal, a specialized application, or any other suitable type of interface.

Figure 3B:
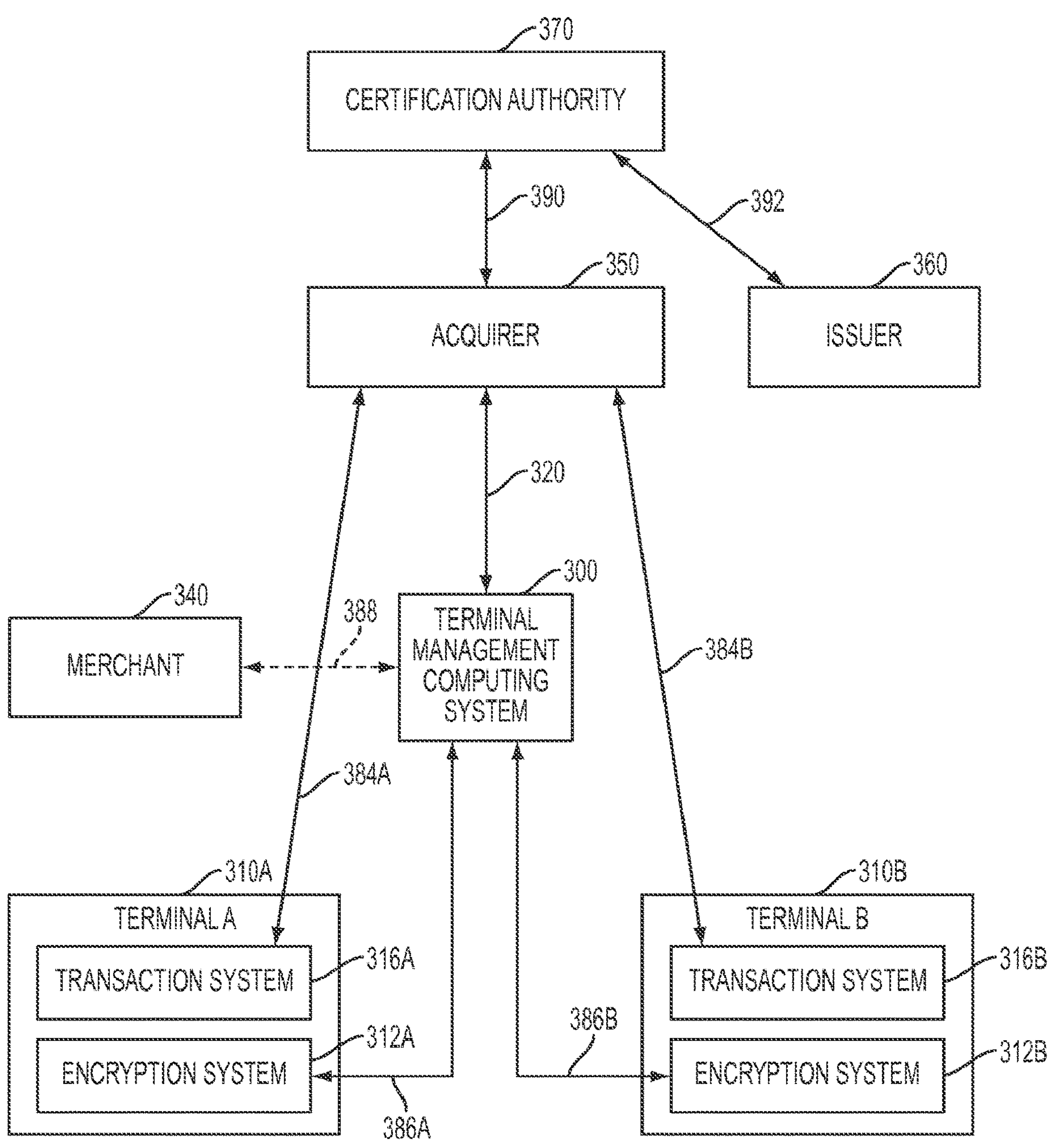
FIG. 3B depicts a block diagram of another example payment terminal communication system.

FIG. 3B depicts a block diagram of another example payment terminal communication system. The illustrated communication system is similar to FIG. 3A, with the exception that the terminal management computing system 300 and the acquirer 250 are separate entities. Accordingly, the certification authority 370 provide keys to the acquirer 350 via a communication link 390 and the acquirer then passes it along to the terminal management computing system 300 via communication link 320.

Payment terminals implementing EMV technology can utilize any number of authentication techniques for process ICC cards, including static data authentication (SDA) and dynamic data authentication (DDA). In either case, a terminal management computing system can be used to receive encryption-related data from a certification authority and pass it along to the appropriate payment terminal. Additional details regarding example authentication techniques are described in EMV Integrated Circuit Card Specifications for Payment Systems, Book 2, Security and Key Management, Version 4.3, November 2011.

FIG. 4 depicts an example process flow diagram for offline static data authentication. The process includes a card issuer 460, a certification authority 470 and an acquirer 450. While a terminal management computing system 400 is shown as a component of the acquirer 450, in other embodiments, they may be separate entities (as shown in FIG. 3B, for example). Offline static data authentication is performed by the terminal 410 using a digital signature scheme based on public key techniques to confirm the legitimacy of critical ICC-resident static data. This can detect authorization alteration of data after personalization. Static Data Authentication (SDA) is a form of offline state data authentication that verifies the data identified by the Application File Locator (AFL) and by the optional Static Data Authentication Tag List. SDA can require the existence of the certification authority 470, which can be a highly secure cryptographic facility that 'signs' the issuer's public keys.

The terminal 410 can contain the appropriate certification authority's public key(s) 416 for every application recognized by the terminal 410. In some cases, multiple applications can share the same 'set' of certification authority public keys 416.

In one embodiment, to support SDA, the terminal 410 can store six certification authority public keys 416 per Registered Application Provider Identifier (RID) and associate with each such key the key-related information to be used with the key. The public key 416 can be provided to the acquirer 400, which then uses the terminal management computing system 400 to provide it to terminal 410.

To support SDA, an ICC 406 can contain the Signed Static Application Data 404 (SSAD), which is static application data 402 signed with the Issuer Private Key 408. The Issuer Public Key 424 can be stored on the ICC 406 with a public key certificate 412.

The terminal 410 may also support a Certification Revocation List (CRL) that lists the Issuer Public Key Certificates that have been revoked. If, during SDA, a concatenation of the RID and Certification Authority Public Key Index from the ICC 406 and the Certificate Serial Number recovered from the Issuer Public Key Certificate is on this list, SDA fails. In some embodiments, the CRL is provided to the acquirer 450. The CRL may then be provided to the terminal 410 by the terminal management computing system 400.

During a transaction at the terminal 410 using an ICC 406, the ICC 406 provides the issuer private key certificate 412 and the SSAD 404 to the terminal 410. The terminal 410 uses the public key 416 to verify that the issuer's public key 424 was signed by the certification authority 410 with private key 414. The terminal uses the issuer public key 424 to verify that the ICC's 406 SSAD 404 was signed by the issuer 460.

FIG. 5 depicts an example process flow diagram for offline dynamic data authentication. The process includes a card issuer 560, a certification authority 570 and an acquirer 550. While a terminal management computing system 500 is shown as a component of the acquirer 550, in other embodiments, they may be separate entities (as shown in FIG. 3B, for example). Offline dynamic data authentication can be performed by the terminal 510 using a digital signature scheme based on public key techniques to authenticate the ICC 506 and confirm the legitimacy of critical ICC-resident/generated data and data received from the terminal 510.

Two forms of offline dynamic data authentication exist. A first form is Dynamic Data Authentication (DDA), which can be executed before card action analysis. Using DDA, the ICC 506 generates a digital signature on ICC-resident/generated data identified by the ICC Dynamic Data and data received from the terminal 510 identified by the Dynamic Data Authentication Data Object List (DDOL). The ICC generates a digital signature on ICC-resident/generated data identified by the ICC Dynamic Data, which contains a transaction certification (TC) or an Authorization Request Cryptogram (ARQC), and an unpredictable number generated by the terminal.

Various types of offline dynamic data authentication can require the existence of, a highly secure cryptographic facility that 'signs' the Issuer's Public Keys 524, such as the certification authority 570. The terminal 510 can contain the appropriate certification authority's public key(s) 516 for every application recognized by the terminal 510. In some cases, multiple applications can share the same 'set' of certification authority public keys 516. To support offline dynamic data authentication, each terminal may store a plurality of certification authority public keys 516 per RID and associate with each such key the key-related information to be used with the key. These public keys 516 can be transmitted by the certification authority 570 to the acquirer 550, which utilizes the terminal management computing system 500 to provide the keys to the terminals 510.

In accordance with offline dynamic data authentication, an ICC 506 can own its own unique public key pair consisting of a private signature key 502 and the corresponding public verification key 520. The ICC Public Key 520 can be stored on the ICC 506 in a public key certificate 522. In some cases, a three-layer public key certification scheme is used. Each ICC Public Key 520 is certified by its issuer 560, and the certification authority 570 certifies the Issuer Public Key 524. This implies that, for the verification of an ICC signature, the terminal 510 first needs to verify two certificates in order to retrieve and authenticate the ICC Public Key 520, which is then employed to verify the ICC's dynamic signature.

To execute offline dynamic data authentication, the terminal 510 can first retrieve and authenticate the ICC Public Key 520 (this process may be called ICC Public Key authentication). All the information necessary for ICC Public Key authentication can be stored in the ICC 506.

Similar to the terminal 410 in FIG. 4, the terminal 510 may support a Certification Revocation List (CRL) that lists the Issuer Public Key Certificates 512 that have been revoked. The CRL may be provided to the terminal 510 by the terminal management computing system 500. If, during dynamic data authentication (DDA or CDA), a concatenation of the RID and Certification Authority Public Key Index from the card and the Certificate Serial Number recovered from the Issuer Public Key Certificate is on this list, dynamic data authentication fails.

During a transaction at the terminal 510 using an ICC 506, the ICC 506 provides the issuer private key certificate 512, which is the issuer public key 524 signed by the certification authority 570 with private key 514. The ICC 506 also provides the ICC PK certificate 522, which is the ICC public key 520 and static application data 504 signed by the issuer private key 508. The terminal 410 uses the public key 516 to verify that the issuer's public key 524 was signed by the certification authority 410. The terminal uses the issuer public key 424 to verify that the ICC public key 520 and the static application data 504 were signed by the issuer 560.

FIG. 6 depicts a message sequence chart for an example certificate "pull" scenario for a payment terminal communication system comprising a terminal 610, a terminal management computing system 600, and a vendor global terminal management service 620. When the software executing on terminal 610 is in need of an updated certificate, a request 650 is sent to the terminal management computing system 600. The request 650 can be sent through a closed-network 640. In some embodiments, the address, such as an IP address or MAC address, of the terminal management computing system 650 is coded into the software of the terminal 610, such that when the terminal needs an updated certificate, it automatically sends an appropriate request to the terminal management computing system 600. Upon receiving the request, the terminal management computing system 600 can process the request and determine the appropriate vendor global terminal management service to contact, such as a MASTERCARD® server, a FISERV® server, or other appropriate entity based on the request from the terminal 610. Using message 652, the terminal management computing system 600 contacts the vendor global terminal management service 620 to request the information needed by the terminal 610, such as an updated certificate, a software update, a software patch, and so forth. The vendor global terminal management service 620 responds with a message 654 that includes the requested data. As illustrated, the message 652 and the message 654 can be sent through an open-network 630, which is different from the closed-network 640. Upon receiving the data from the vendor global terminal management service 620, the terminal management computing system 600 sends a message 656 to the terminal 610 that includes the requested updated certificate.

FIG. 7 depicts a message sequence chart for an example certificate "push" scenario for a payment terminal communication system comprising a terminal 710, a terminal management computing system 700, and a vendor global terminal management service 720. In this embodiment, the terminal management computing system 700 obtains updated certificates, updated software, and the like from the vendor global terminal management service 720 without receiving a request from the terminal 710. In some embodiments, the terminal management computing system 700 tracks anticipated expirations of certificates or keys on the terminal 710 and gathers updated certificate or keys prior to the expiration from the appropriate sources. In some embodiments, the vendor global terminal management service 720 sends a message to the terminal management computing system 700 indicating a software update is available. In any event, using message 752, the terminal management computing system 700 contacts the vendor global terminal management service 720 to request the information on behalf of the terminal 710, such as an updated certificate, a software update, a software patch, and so forth. The vendor global terminal management service 720 responds with a message 754 that includes the requested data. As illustrated, the message 752 and the message 754 can be sent through an open-network 730. In some embodiments, the message 752 is omitted. Upon receiving the data from the vendor global terminal management service 720, the terminal management computing system 700 sends a message 756 to the terminal 710 through a closed-network 770 that includes the requested updated certificate, or other data received from the vendor global terminal management service 720. The message 756 can be transmitted to the terminal 710 by the terminal management computing system 700 at any suitable time. For example, in some embodiments, the message 756 is sent during a period of time in which the terminal 710 typical experiences little payment activity, such as from 1 AM to 3 AM. In some embodiments, the terminal management computing system 700 can send a message to the terminal 710 indicating that an updated certificate, or other type of data, is available for download and waits to receive a request from the terminal 710.

FIG. 8 depicts a message sequence chart for an example certificate push scenario for a payment terminal communication system comprising a merchant 840, a certification authority 870, an acquirer 850, a terminal management computing system 800, and a terminal 810. The certification authority 870 distributes a message 820 including a certification authority public key to the acquirer 850. In a message 822, the acquirer 850 provides the public key to the terminal management computing system 800. The terminal management computing system 800 then provides the public key to the terminal 810 in a message 824, either upon receiving the key from the acquirer 850 or based upon merchant-defined rules or other key distribution rules. The merchant 840 can send a message 826 to the terminal management computing system 800 requesting a status update on terminal 810. Upon receiving the message 826, the terminal management computing system 800 can poll terminal 810 using message 828 to retrieve the information requested by the merchant 840. As is to be appreciated, a variety of informational requests can be made by the merchant 840, including a determination if any keys are expired, when certain keys were downloaded by the terminal, a software version query, a confirmation that a key was successfully received by the terminal 810, and so forth. The terminal 810 responds to the status request with message 830. The terminal management computing system 800 then provides a message 832 to the merchant with the requested information. Through interactions between the merchant 840 and the terminal management computing system, the merchant 840 can also schedule, customize, or otherwise control the distribution of various keys and software updates or patches. For example, the merchant 840 may identify certain time windows the terminal management computing system 800 can use to communicate with the terminal 810. Such time windows can coincide, for example, with time windows typically having a low number of transactions.

Figure 9:
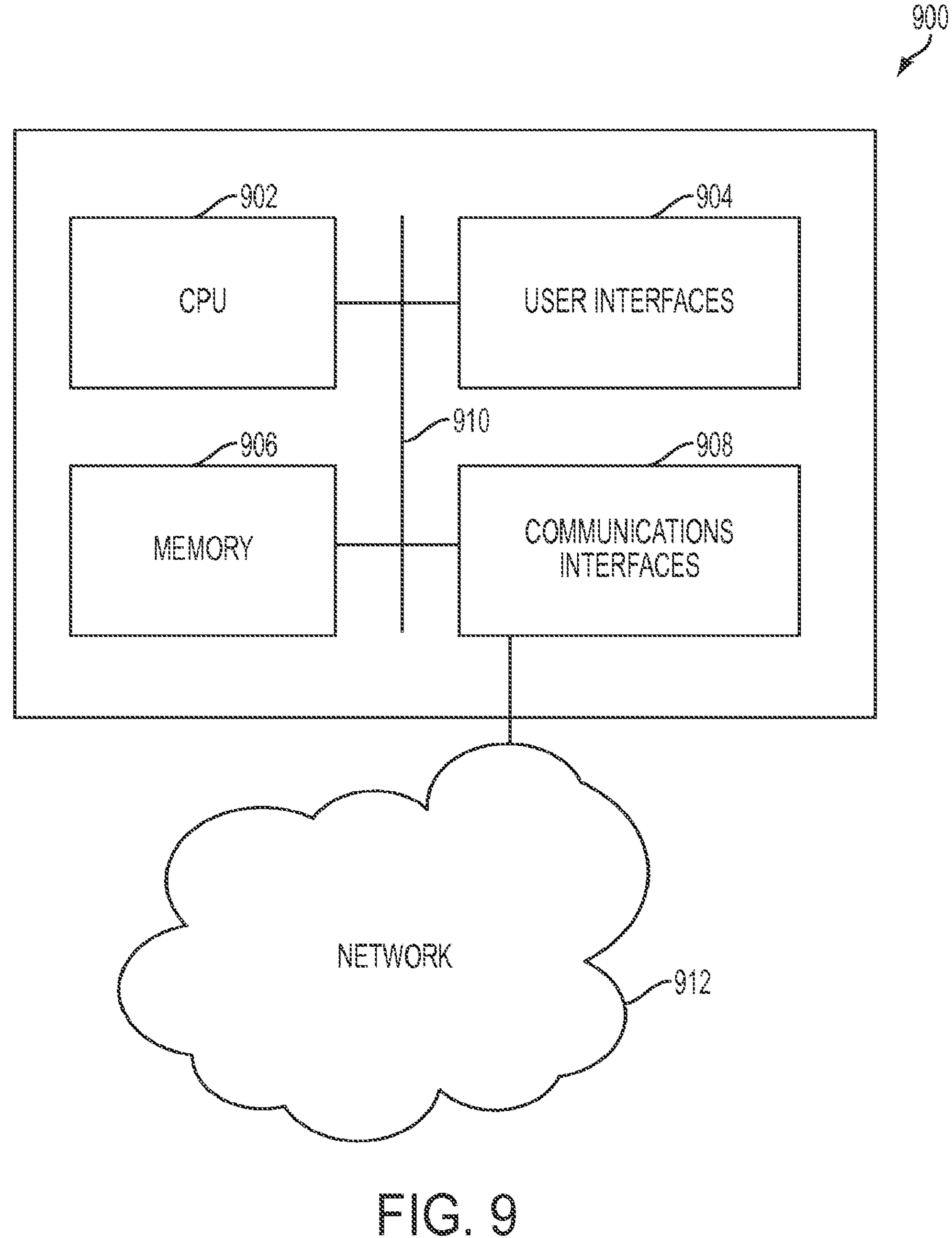
FIG. 9 depicts example elements of an exemplary computing device.

Referring now to FIG. 9, example elements of an exemplary computing device 900 are illustrated. The computing device 900 can be desktop computer, a server, a mobile computing device such as a smartphone, or any other suitable computing device as would be understood in the art. The computing device 900 can include a processor 902 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 900 is also shown to include one or more memories (e.g., memory 906), for example read only memory (ROM), random access memory (RAM), cache memory associated with the processor 902, or other memories such as dynamic RANI (DRAM), static ram (SRAM), flash memory, a removable memory card or disk, a solid state drive, and so forth. The computing device 900 can additionally or alternatively also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 902, or memory 906 are also contemplated as storage devices.

Network and communication interfaces 908 can allow the computing device 900 to communicate with other devices across a network 912. The network and communication interfaces 908 can be an Ethernet interface, a radio interface, a telephony interface, a Universal Serial Bus (USB) interface, or any other suitable communications interface. Example communication interfaces 980 can includes wired data transmission links such as Ethernet and TCP/IP, as well as PSTN communications links such as T1s (or better), integrated services digital network (ISDN), Digital Subscriber Line (DSL), or dialup modems that implement, for example, the point-to-point protocol (PPP). The communication interface 980 can include wireless protocols for interfacing with the network 912 which can private or public networks 912, such as closed-loop and open-loop networks. For example, the network and communication interfaces 908 and protocols can include interfaces for communicating with private wireless networks such as a WiFi network, one of the IEEE 802.11x family of networks, or another suitable wireless network. The network and communication interfaces 908 can include interfaces and protocols for communicating with public wireless networks, using for example wireless protocols used by cellular network providers, including Code Division Multiple Access (CDMA) and Global System for Mobile Communications (GSM). A computing device 900 can use network and communication interfaces 908 to communicate with hardware modules such as a database or data store, or one or more servers or other networked computing resources. Data can be encrypted or protected from unauthorized access.

In various configurations, the computing device 900 can include a system bus 910 for interconnecting the various components of the computing device 900, or the computing device 900 can be integrated into one or more chips such as programmable logic device or application specific integrated circuit (ASIC). The system bus 910 can include a memory controller, a local bus, or a peripheral bus for supporting input and output devices 904, or communication interfaces 908. Example input and output devices 904 include keyboards, keypads, gesture or graphical input devices, motion input devices, touchscreen interfaces, displays, audio units, voice recognition units, vibratory devices, computer mice, and any other suitable user interface.

The processor 902 and memory 906 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language. Various computing devices described herein, such as payment terminals, acquirers, vendor terminal management services, issuers, and terminal management computing systems, can incorporate computing devices similar to the computing device 900 illustrated in FIG. 9.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semipermanent, and/or semitemporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signals.

In various embodiments disclosed herein, a single component can be replaced by multiple components and multiple components can be replaced by a single component to perform a given function or functions. Except where such substitution would not be operative, such substitution is within the intended scope of the embodiments. Any servers described herein, for example, can be replaced by a "server farm" or other grouping of networked servers (such as server blades) that are located and configured for cooperative functions. It can be appreciated that a server farm can serve to distribute workload between/among individual components of the farm and can expedite computing processes by harnessing the collective and cooperative power of multiple servers. Such server farms can employ load-balancing software that accomplishes tasks such as, for example, tracking demand for processing power from different machines, prioritizing and scheduling tasks based on network demand and/or providing backup contingency in the event of component failure or reduction in operability.

The computer systems can comprise one or more processors in communication with memory (e.g., RANI or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method comprising:

tracking, by a terminal management computing system, an expiration date of each of one or more certificates or one or more keys of one or more encryption systems;

selecting, by the terminal management computing system, based on the tracking, a certificate or a key of an encryption system having an expiration date that is closest in time to a current date;

requesting, by the terminal management computing system that is in network communication with a plurality of remote payment terminals via a closed network, an update to the certificate or the key of the encryption system of a remote payment terminal from a vendor global terminal management service via an open network prior to the expiration date of the certificate or the key of the encryption system;

receiving, by the terminal management computing system, the update to the certificate or the key of the encryption system from the vendor global terminal management service via the open network;

determining, by the terminal management computing system, an encryption technology utilized by the encryption system of the remote payment terminal, wherein the encryption technology includes a static data authentication or a dynamic data authentication; and transmitting, by the terminal management computing system, the update to the encryption system of the remote payment terminal based on the determined encryption technology via the closed network during a period of reduced payment activity at the remote payment terminal.

2. The method of claim 1, wherein the remote payment terminal is configured with a network address of the terminal management computing system.

3. The method of claim 1, further comprising:

determining, by the terminal management computing system, the vendor global terminal management service to contact based on the update request.

4. The method of claim 3, further comprising:

receiving, by the terminal management computing system, the update to the encryption system from the vendor global terminal management service for encrypting communications generated by the remote payment terminal via the open network, based on requesting the update to the encryption system.

5. The method of claim 4, wherein the open network is different than the closed network.

6. The method of claim 1, wherein the update to the encryption system is a software update or a software patch.

7. A terminal management computing system that is in network communication with a plurality of remote payment terminals via a closed network, the terminal management computing system comprising:

a memory configured to store instructions; and a processor configured to execute the instructions to perform operations comprising:

tracking an expiration date of each of one or more certificates or one or more keys of one or more encryption systems;

selecting, based on the tracking, a certificate or a key of an encryption system having an expiration date that is closest in time to a current date;

requesting an update to the certificate or the key of the encryption system of a remote payment terminal from a vendor global terminal management service via an open network prior to the expiration date of the certificate or the key of the encryption system;

receiving the update to the certificate or the key of the encryption system from the vendor global terminal management service via the open network;

determining an encryption technology utilized by the encryption system of the remote payment terminal, wherein the encryption technology includes a static data authentication or a dynamic data authentication; and transmitting the update to the encryption system of the remote payment terminal based on the determined encryption technology via the closed network during a period of reduced payment activity at the remote payment terminal.

8. The terminal management computing system of claim 7, wherein the remote payment terminal is configured with a network address of the terminal management computing system.

9. The terminal management computing system of claim 7, wherein the operations further comprise:

determining the vendor global terminal management service to contact based on the update request.

10. The terminal management computing system of claim 9, wherein the operations further comprise:

receiving the update to the encryption system from the vendor global terminal management service for encrypting communications generated by the remote payment terminal via the open network, based on requesting the update to the encryption system.

11. The terminal management computing system of claim 10, wherein the open network is different than the closed network.

12. The terminal management computing system of claim 7, wherein the update to the encryption system is a software update or a software patch.

13. A non-transitory computer-readable medium storing instructions that, when executed by a processor that is in network communication with a plurality of remote payment terminals via a closed network, cause the processor to perform operations comprising:

tracking an expiration date of each of one or more certificates or one or more keys of one or more encryption systems;

selecting, based on the tracking, a certificate or a key of an encryption system having an expiration date that is closest in time to a current date;

requesting an update to the certificate or the key of the encryption system of a remote payment terminal from a vendor global terminal management service via an open network prior to the expiration date of the certificate or the key of the encryption system;

receiving the update to the certificate or the key of the encryption system from the vendor global terminal management service via the open network;

determining an encryption technology utilized by the encryption system of the remote payment terminal, wherein the encryption technology includes a static data authentication or a dynamic data authentication; and transmitting the update to the encryption system of the remote payment terminal based on the determined encryption technology via the closed network during a period of reduced payment activity at the remote payment terminal.

14. The non-transitory computer-readable medium of claim 13, wherein the remote payment terminal is configured with a network address of a terminal management computing system.

15. The non-transitory computer-readable medium of claim 13, wherein the operations further comprise:

determining the vendor global terminal management service to contact based on the update request.

16. The non-transitory computer-readable medium of claim 15, wherein the operations further comprise:

receiving the update to the encryption system from the vendor global terminal management service for encrypting communications generated by the remote payment terminal via the open network, based on requesting the update to the encryption system.

17. The non-transitory computer-readable medium of claim 13, wherein the open network is different than the closed network.

* * * * *